United States Patent [19]
Wagner

[11] 3,977,000
[45] Aug. 24, 1976

[54] MONOPULSE RADAR RECEIVER
[75] Inventor: Ronald A. Wagner, Hudson, Mass.
[73] Assignee: Raytheon Company, Lexington, Mass.
[22] Filed: Nov. 4, 1974
[21] Appl. No.: 520,593

[52] U.S. Cl. ............................................. 343/16 M
[51] Int. Cl.² .......................................... G01S 9/22
[58] Field of Search ................................. 343/16 M

[56] References Cited
UNITED STATES PATENTS
3,050,724  8/1962  Stillwell ............................ 343/16 M
3,175,215  3/1965  Blasberg et al. .................. 343/16 M
3,560,974  2/1971  Lecourtier et al. ............... 343/16 M Primary Examiner—T.H. Tubbesing
Attorney, Agent, or Firm—Philip J. McFarland; Richard M. Sharkansky; Joseph D. Pannone

[57] ABSTRACT

An improved monopulse receiver is shown to include an I.F. section wherein monopulse pairs of signals, meaning a sum and an elevation difference signal pair and a sum and an azimuth difference signal pair, are passed through paths arranged so that the signals making up each such pair are subjected to the same phase shift and amplification.

6 Claims, 2 Drawing Figures

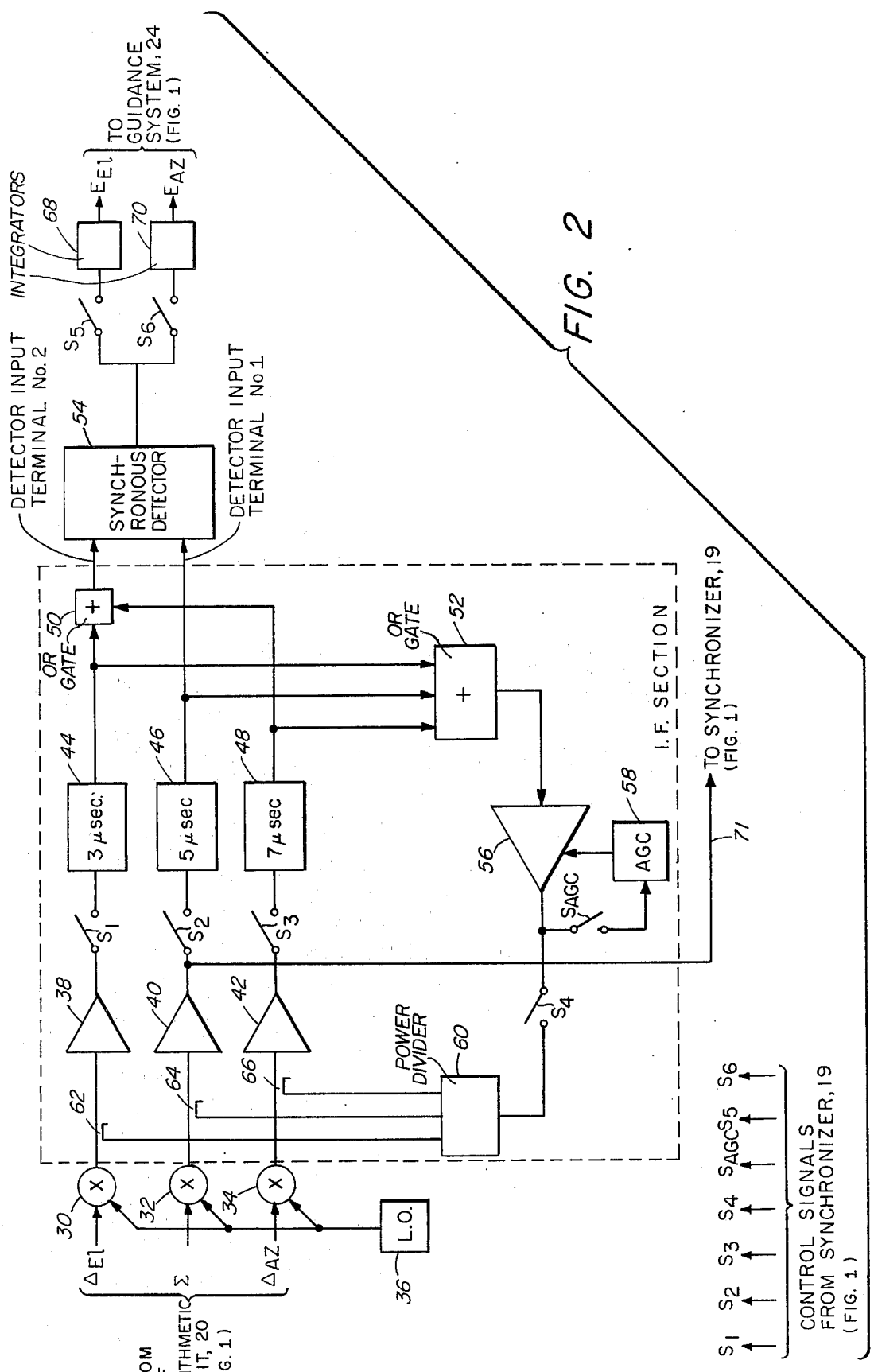

MONOPULSE RADAR RECEIVER

The invention herein described was made in the course of or under a contract or subcontract thereunder, with the Department of Defense.

BACKGROUND OF THE INVENTION

This invention pertains generally to radio frequency receivers and particularly to receivers which are used in monopulse radar systems.

It is well known in the art that, in a conventional two or three channel monopulse receiver, imbalances between channels may cause unacceptably large errors to be experienced. To eliminate the causes of such errors in a multichannel monopulse receiver it is necessary that, in addition to providing properly designed and fabricated radio frequency comparators (sometimes referred to as "R.F. arithmetic units") which produce the required radio frequency sum and difference signals for the different channels in such types of receivers, the intermediate frequency sections of such receivers must be designed, fabricated and operated so that amplitude and phase imbalances are kept to a minimum. In particular, the I.F. amplifiers in the various channels must be so designed, fabricated and operated that, regardless of changes in signal level or environmental conditions, amplitude and phase imbalances between such amplifiers are reduced to a minimum. In the present state of the art, amplifiers exhibiting the required degree of stability are difficult to design and fabricate, making production of multi-channel monopulse receivers rather expensive and difficult.

It has been proposed to provide a monopulse receiver wherein the sum and difference signals out of R.F. arithmetic units are combined in such a manner that a single I.F. amplifier may be used for the sum and difference signals. Thus, in one such proposed approach, a plurality (say three) different local oscillators are provided, each producing one of three different I.F. signals to heterodyne with the sum and two difference signals out of an R.F. arithmetic unit in a monopulse receiver. With the frequencies of the local oscillators properly chosen, three I.F. signals within the bandpass of a single amplifier may be obtained so that the sum and two difference signals may be amplified simultaneously. The I.F. amplifier is designed to normalize the signals by hard limiting so that all signals out of such amplifier have the same amplitude. Further, if the frequency response of the I.F. amplifier is flat, all signals on passing through the I.F. amplifier are subject to the same phase shift. Thus, amplitude and phase imbalances are minimized. The three amplified signals out of the I.F. amplifier may be separated by appropriate filters and processed. While the single channel approach obviates much of the "balancing" difficulties experienced with the conventional two or three channel approach, other difficulties are experienced. For example, because the sum and difference signals passing through the I.F. amplifier differ only slightly in frequency, their complete separation by bandpass filters is difficult to achieve with the result that undesirable intermodulation may occur between the sum and difference signals. Further, such a "single channel" approach requires a plurality of local oscillators having different frequencies which must be precisely maintained during operation.

SUMMARY OF THE INVENTION

With the foregoing in mind it is a primary object of this invention to provide an improved receiver for use in a monopulse radar system.

Another object of this invention is to provide an improved receiver for use in a monopulse radar system, such receiver providing the advantages of a single channel receiver without suffering from the disadvantages of any known single channel receiver.

These and other objects of this invention are attained generally by providing, in a monopulse radar system, an improved monopulse receiver which comprises an R.F. arithmetic unit responsive to each receiver echo signal received by a radar antenna in such system to produce a sum and two difference signals for processing in circuit with a single I.F. amplifier in an I.F. section, such section including time multiplexing and demultiplexing means operative first to delay the simultaneously produced sum and difference signals out of an R.F. arithmetic unit by first predetermined lengths of time so that such signals are sequentially passed through the I.F. amplifier and then to delay the outputs of such amplifier by second predetermined lengths of time to produce time coincident pairs of signals for processing. In a preferred embodiment, the time multiplexing and demultiplexing means includes a plurality of delay lines, corresponding in number with the number of signals out of the R.F. arithmetic unit, and switching means for connecting such delay lines to either the input or the output of the I.F. amplifier. With proper time delays imparted by the individual delay lines and a proper switching arrangement, a first delayed signal analogous to the sum signal and first one of the difference signals may be caused to pass through a first combination of circuit elements, including an I.F. amplifier, to arrive simultaneously at the input terminals of a coherent detector and a second delayed signal analogous to the sum signal and a second one of the difference signals may be caused to pass through a second combination of circuit elements, including the same I.F. amplifier as is in the first combination, to arrive later, but simultaneously, at the input terminals of the coherent detector. The level of the first or second delayed signal analogous to the sum signal through the I.F. amplifier is detected and processed to provide automatic gain control for the I.F. amplifier to increase the dynamic range of the contemplated receiver.

BRIEF DESCRIPTION OF THE DRAWINGS

For a more complete understanding of this invention, reference is now made to the accompanying description of the attached drawings, in which:

FIG. 2 is a block diagram of a preferred embodiment of this invention whereby a sum signal, an elevation difference signal and an azimuth difference signal out of an R.F. arithmetic unit in a monopulse radar receiver may be multiplexed and demultiplexed so that such signals are passed through common paths including a single I.F. amplifier.

DESCRIPTION OF THE PREFERRED EMBODIMENTS

Figure 1:
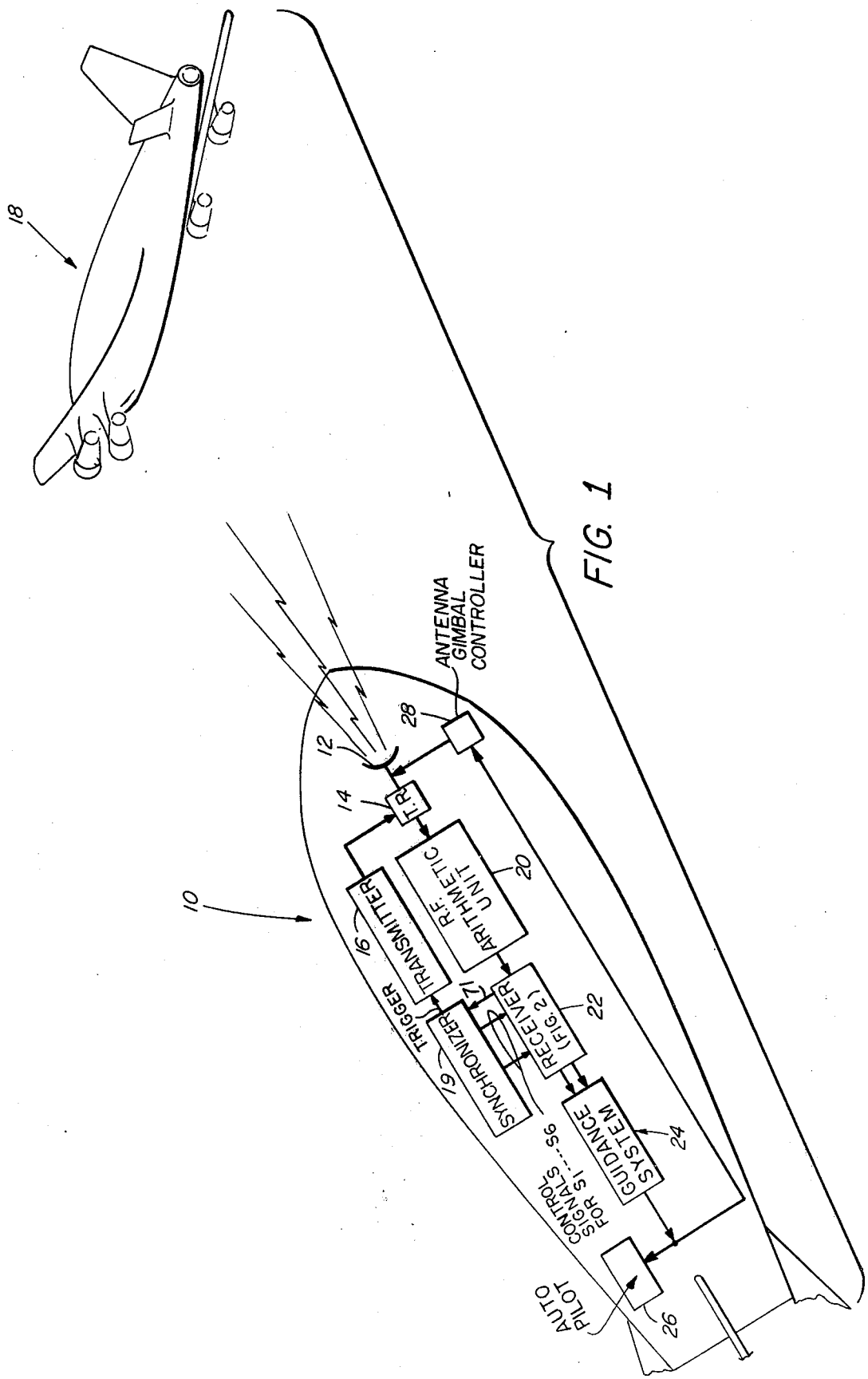
FIG. 1 is a sketch, greatly simplified for expository reasons, showing the relationship of the contemplated receiver to the main parts of a monopulse radar system in a missile, here one having an active guidance system.

Referring now to FIG. 1 it may be seen that a receiver according to this invention may be used in a missile 10 having an active radar controlled guidance system. Thus, a monopulse antenna 12 is energized, by way of a conventional transmit-receive switch 14, by a transmitter 16 to illuminate a target 18 with a beam (not shown) of R.F. energy. The transmitter 16 is here actuated in a conventional manner by trigger signals from a conventional synchronizer 19. Echo signals from the target 18 are received by the monopulse antenna 12 and, after passing through the transmit-receive switch 14, are here converted in an R.F. arithmetic unit 20 to a sum signal, $\Sigma$, and two difference signals $\Delta EL$ and $\Delta AZ$. The R.F. arithmetic unit 20 preferably is conventional in construction and the three signals derived from the received echo signals represent the well known "sum," "elevation difference" and "azimuth difference" signals required for two dimensional tracking using monopulse principles. The signals out ot the R.F. arithmetic unit 12 are passed to a receiver 22 (shown in detail in FIG. 2 and described hereinafter). Suffice it to say here that the three signals are heterodyned with a single local oscillator signal to produce three simultaneous intermediate frequency signals corresponding, respectively, to the $\Sigma$, $\Delta EL$ and $\Delta AZ$ signals out of the R.F. arithmetic unit 12. These I.F. signals then are, in a manner to be described, time multiplexed and amplified in a single I.F. amplifier (not shown in FIG. 1), demultiplexed and detected in a conventional manner to produce signals representative of the boresight error in elevation and the boresight error in azimuth. Such signals are then fed to a conventional autopilot 26 and antenna gimbal controller 28 to direct the missile 10 on a collision course with the target 18 and to maintain angle between the boresight line of the monopulse antenna 12 and the line of sight from the missile 10 to the target 18 at a constant value.

It will be recognized that the just outlined system is a conventional "proportional navigation" guidance system for a missile. It will also be recognized that the contemplated receiver constitutes an improvement in one major component common to active and semi-active guidance systems for missiles, meaning that a receiver of the type now to be described is equally well adapted to be used in a semi-active guidance system or, for that matter, in any monopulse radar system.

Referring now to FIG. 2 it may be seen that the signals $\Delta EL$, $\Sigma$, $\Delta AZ$ out of the R.F. arithmetic unit 20 (FIG. 1) are applied, respectively, to mixers 30, 32, 34. The output signal of a local oscillator 36 is applied to the mixers 30, 32, 34 to produce, inter alia, three intermediate frequency signals. The signals out of the mixers 30, 32, 34 are applied, as shown, to three preamplifiers 38, 40, 42. These preamplifiers are preferably narrow band amplifiers, permitting only the desired intermediate frequency signals out of the mixers 30, 32, 34 to be amplified. The outputs of the preamplifiers 38, 40, 42 are, by way of switches $S_1$, $S_2$, $S_3$, passed as shown to delay lines 44, 46, 48. Each one of the just-mentioned elements is a conventional I.F. delay line such as an acoustic delay line. The delay line 44 here first delays the $\Delta EL$ signal by three microseconds (it will be shown that it also delays the $\Sigma$ signal by three microseconds after such signal passes through delay line 46; the delay line 46 here first delays the $\Sigma$ signal by 5 microseconds (it will be shown that it also delays the $\Delta EL$ and the $\Delta AZ$ signals by 5 microseconds after such signals pass through delay lines 44, 48 respectively); and the delay line 48 here first delays the $\Delta AZ$ signal by 7 microseconds (it will be shown that it also delays the $\Sigma$ signal by 7 microseconds after signal passes through delay line 46).

The outputs of the delay lines 44, 48 are connected, as shown, to analog OR gates 50, 52 and the output of the delay line 46 is connected, as shown, to one input terminal (here designated as "detector input terminal No. 1") of a conventional synchronous detector 54 and to the analog OR gate 52. The analog OR gate 50 is connected to the second input terminal (here designated "detector input terminal No. 2") of the synchronous detector 54. It will be noted here in passing that the $\Delta EL$, $\Sigma$ and $\Delta AZ$ signals are now time-multiplexed, i.e. the $\Delta EL$, $\Sigma$ and $\Delta AZ$ signals which occur simultaneously out of the mixers 30, 32, 34 are now impressed sequentially (at two microsecond intervals) on the analog OR gate 52. It will also be noted that because both input terminals of the synchronous detector 54 are not now energized simultaneously, there is no output signal from that element.

The time-multiplexed signals (sometimes referred to as the "triad" signals) out of the analog OR gate 52 pass sequentially through an I.F. amplifier 56. A conventional automatic gain control circuit 58, actuated by a control signal from the synchronizer 19 (FIG. 1) so as to be responsive only to the level of the $\Sigma$ signal in the triad signals, normalizes the amplitude of the individual signals in the triad signals. The output signals of the I.F. amplifier 56 are connected, through a switch $S_4$, to a power divider 60 and thence, through couplers 62, 64, 66, to the inputs of preamplifiers 38, 40, 42. The output of the synchronous detector 54 is connected, by way of switches $S_5$ and $S_6$ as shown, to integrators 68, 70. The latter then produce an elevation error signal, $E_{EL}$, and an azimuth error signal, $E_{AZ}$, which are passed to the guidance system 24 (FIG. 1).

It will now be apparent that the synchronizer 19 (FIG. 1) here controls operation of the various switches in the contemplated receiver. That is, in addition to producing the usual signals required for operation of a radar, the synchronizer 19 here produces signals to operate the various switches in accordance with the following TABLE I:

TABLE I

| Time Delay (Microseconds After Echo Signals Received) | $S_1$ | $S_2$ | $S_3$ | $S_4$ | $S_5$ | $S_6$ | $S_{AGC}$ |
|---|---|---|---|---|---|---|---|
| 0 | Close | Close | Close | Open | Open | Open | Open |
| 1 | Open | Open | Open | " | " | " | " |
| 2 | " | " | " | " | " | " | " |
| 3 | " | Close | " | Close | " | " | " |
| 4 | " | Open | " | Open | " | " | " |

TABLE I-continued

| Time Delay (Microseconds After Echo Signals Received) | $S_1$ | $S_2$ | $S_3$ | $S_4$ | $S_5$ | $S_6$ | $S_{AGC}$ |
|---|---|---|---|---|---|---|---|
| 5 | Close | '' | Close | Close | '' | '' | Close |
| 6 | Open | '' | Open | Open | '' | '' | Open |
| 7 | '' | Close | '' | Close | '' | '' | '' |
| 8 | '' | Open | '' | Open | Close | '' | '' |
| 9 | '' | '' | '' | '' | Open | '' | '' |
| 10 | '' | '' | '' | '' | '' | '' | '' |
| 11 | '' | '' | '' | '' | '' | '' | '' |
| 12 | '' | '' | '' | '' | '' | Close | '' |
| 13 | '' | '' | '' | '' | '' | Open | '' | where "Close" means signal is being passed.

It will be obvious to one of skill in the art that the synchronizer 19 (FIG. 1) may be easily adapted, using conventional and well known logical circuits, to produce the requisite control signals to actuate the various switches in the sequence shown in TABLE I. For example, the signal appearing at the output of the preamplifier 40 which corresponds to reception of an echo signal could be passed through a line 71 and detected to produce, in any convenient manner, a "logical one" signal. Such a signal could then be shifted through a shift register so that the logic one is present at the time indicated in TABLE I in each stage. The logic one in any stage could then be used to actuate conventional drivers to close the switches as indicated in TABLE I.

The operational cycle of the disclosed receiver will now be described. When an echo signal is received, at time $t_o$, the R.F. arithmetic unit 20 produces, simultaneously, $\Delta EL$, $\Sigma$ and $\Delta AZ$ signals which are downconverted to I.F. signals and passed through the preamplifiers 38, 40, 42 and closed switches $S_1$, $S_2$, $S_3$ to delay lines 44, 46, 48. At time T + 3 microseconds, the $\Delta EL$ signal appears at the output of delay line 44. Such delayed signal is passed through analog OR gate 50, without effect, and through analog OR gate 52 to the input of I.F. amplifier 56. With switch $S_4$ and $S_2$ now closed, the amplified (and delayed by 3 microseconds) $\Delta EL$ signal is passed to the delay line 46. Five microseconds later (or 8 microseconds after its first appearance) such $\Delta EL$ signal appears at the output of the delay line 46 and is: (a) passed to detector input terminal No. 1, and (b) passed, via analog OR gate 52, to I.F. amplifier 56. However, because switch $S_4$ is now open, amplification of the delayed (by 8 microseconds) $\Delta EL$ is not effective.

At time $t_o$ +5 microseconds, the $\Sigma$ signal appears at the output of delay line 46. This delayed signal is applied, without effect, to detector input terminal No. 1 and, via analog OR gate 52, to I.F. amplifier 56. With switches $S_4$, $S_1$, $S_3$ and $S_{AGC}$ now closed, the amplified and delayed (by 5 microseconds) $\Sigma$ signal is applied to delay lines 44 and 48 and to AGC circuit 58. After 3 microseconds (or 8 microseconds) after its first appearance the $\Sigma$ signal is: (a) passed to detector input terminal No. 2 (from the output of the delay line 44 via the analog OR gate 50); and (b) passed, without effect, to the now open switch $S_4$.

It will now be observed that, at time $t_o$ +8 microseconds: (a) both input terminals of the synchronous detector 54 are energized, thereby allowing that element to operate; and (b) the signals energizing the synchronous detector 54, i.e., the delayed $\Sigma$ and $\Delta EL$ signals, have passed through the same elements in the I.F. section of the disclosed receiver. The latter point is of significance in that, if two I.F. signals pass through the same elements which contribute to significant imbalances, albeit in different order, the total phase shift and amplification (or attenuation) suffered by both is the same. That is, no appreciable imbalance, in either phase or amplitude, between the $\Delta EL$ and $\Sigma$ signals is suffered.

Similarly, it will be observed that the $\Delta AZ$ and $\Sigma$ signals are passed through similar paths (which include delay lines 46 and 48 rather than delay lines 44 and 46) to appear simultaneously (after a total of 12 microseconds delay) at the input terminals of the synchronous detector 54. With switches $S_5$ and $S_6$ closed, respectively, at times $t_o$ + 8 microseconds and $t_o$ + 12 microseconds, the desired outputs of the synchronous detector 54 (elevation error, $E_{EL}$, and azimuth error, $E_{AZ}$) may be derived and passed to the guidance system 24 (FIG. 1).

Having described a preferred embodiment of my invention which is operative to allow a plurality of simultaneously occurring I.F. signals to be time-multiplexed in such a manner that selected pairs of such signals may be subjected to the same amount of phase shift and amplification and then to be demultiplexed for further processing, it will be apparent to one of skill in the art that the preferred embodiment may be modified without departing from may inventive concepts. For example, it will be apparent that the switches shown in the paths of the I.F. signals may be eliminated; if such an approach is taken the functions of the switches then would be accomplished by applying control signals to the preamplifiers, the I.F. amplifier and the AGC circuit to allow I.F. signals to pass through the named elements at the times designated in TABLE I. Also, it will be obvious that the particular time delays designated for the various delay lines may be changed within wide limits provided only that the difference in the time delays between adjacent pairs of delay lines be greater than the length of the I.F. signals being processed, the sum of the time delays of adjacent pairs differ and the sum of the delays of adjacent pairs is unequal to the delay of any single delay line (plus the length of the I.F. signals being processed). Taken together, the just-mentioned limitations will ensure complete separation of the I.F. signals passing through the common I.F. amplifier and separation of the recombined pairs of signals at the synchronous detector. Still further, it will be obvious that the sequence of the I.F. signals in the triad signals may be changed. It will be noted that if the time delays of the various delay lines or the order of the I. F. signals in the triad signals are changed, the timing of the various control signals would be changed appropriately. In view of the foregoing it is felt that my invention should not be restricted to its disclosed embodiment but rather should be limited only by the spirit and scope of the appended claims.

What is claimed is:

1. In a monopulse receiver wherein radio frequency signals from a source, such signals corresponding, respectively, to monopulse sum, elevation difference and azimuth difference signals are, in response to echo signals received from a target, simultaneously produced at different output terminals of a radio frequency arithmetic unit and then downshifted in frequency to form corresponding intermediate frequency sum, elevation and azimuth difference signals, an improved intermediate frequency receiver section comprising:
   a. multiplexing means, including a first, second and third delay line imparting successively longer time delays, for converting the simultaneously formed intermediate frequency sum, elevation difference and azimuth difference signals into a triad of sequentially occurring signals;
   b. intermediate frequency amplifying means, including a single amplifier, for amplifying each one of the triad of sequentially occurring signals; and
   c. demultiplexing means for redirecting each separate one of each amplified triad of sequentially occurring signals through selected ones of the first, second and third delay lines to form two sequentially occurring time coincident pairs of signals, one of such pairs being an amplified intermediate frequency sum signal and an amplified intermediate frequency elevation difference signal and the other being an amplified intermediate sum signal and an amplified intermediate frequency azimuth difference signal; and,
   d. demodulation means for deriving, from the two sequentially occurring time coincident pairs of signals, a pair of error signals indicative, respectively, of the elevation and azimuth error of the source of the radio frequency signals.

2. The improved intermediate frequency receiver section as claimed in claim 1 wherein the multiplexing means and the demultiplexing means include a common set of three switching means actuable:
   a. first to connect the elevation difference signal, the sum signal and the azimuth difference signal to, respectively, the first, second and third delay line; and
   b. then sequentially connecting
      i. the one of the triad of amplified signals out of the intermediate frequency amplifier means corresponding to the elevation difference signal to the second delay line;
      ii. the one of such amplified signals corresponding to the sum signal to both the first and the third delay line; and
      iii. the one of such amplified signals corresponding to the azimuth difference signal to the second delay line.

3. The improved intermediate frequency receiver section as claimed in claim 2 wherein the time delay imparted by each one of the delay lines differs from one another.

4. The improved intermediate frequency receiver section as claimed in claim 3 wherein the sum of the time delays imparted by the first and the second delay lines is greater than the time delay imparted by the third delay line and the time delay imparted by each of the delay lines is greater than the length of the simultaneously formed intermediate frequency signals.

5. The improved intermediate frequency receiver section as claimed in claim 4 comprising, additionally, means responsive to the amplified sum signal out of the intermediate frequency amplifying means, for controlling the gain of such amplifying means.

6. The improved intermediate frequency receiver section as in claim 5 comprising, additionally, synchronous detector means responsive to intermediate frequency signals out of the first and the second delay lines.

* * * * *